May 6, 1930. F. R. LACY 1,757,253
ELECTRICALLY HEATED UTENSIL
Filed Sept. 25, 1924
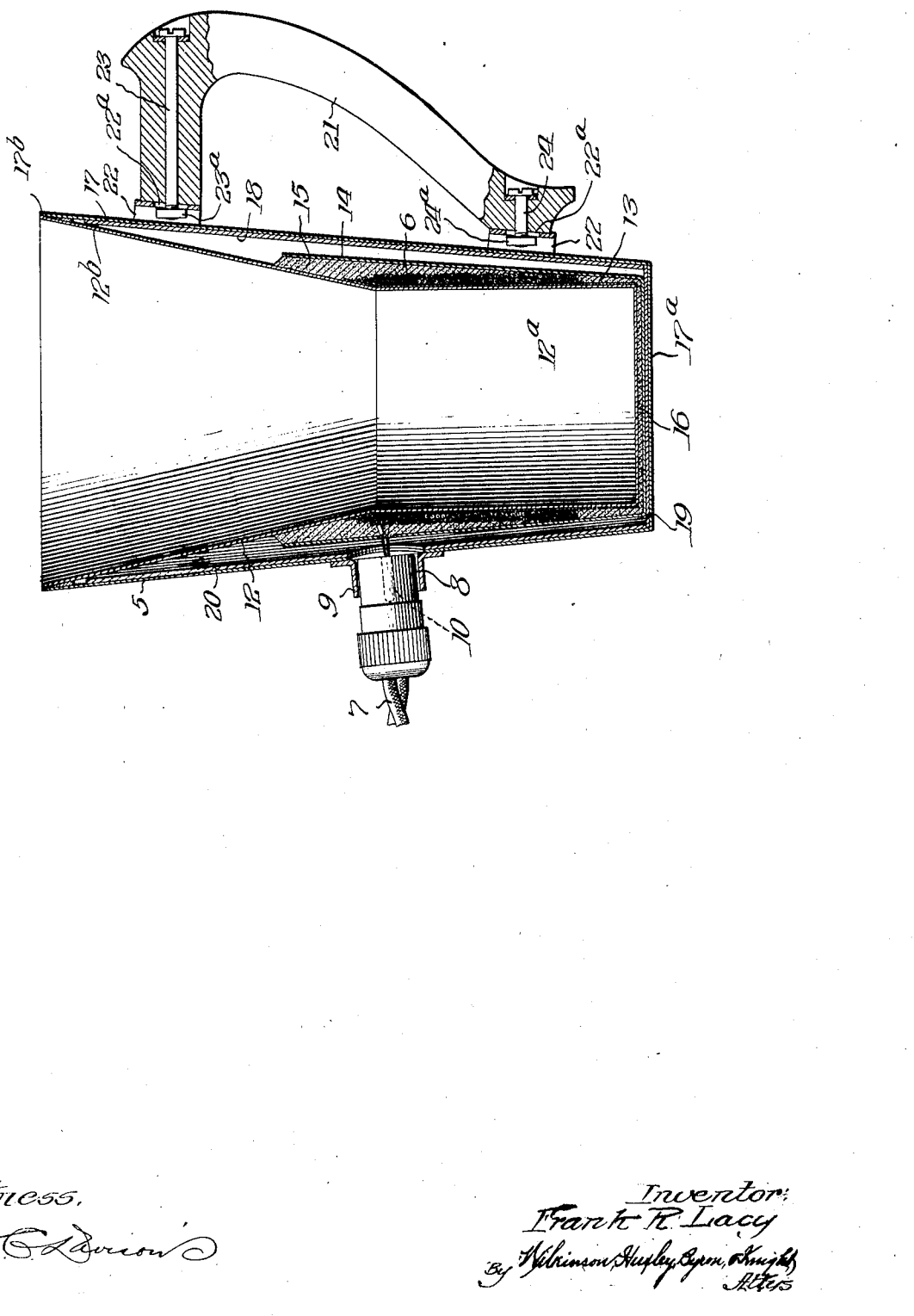

Patented May 6, 1930

1,757,253

UNITED STATES PATENT OFFICE

FRANK R. LACY, OF CHICAGO, ILLINOIS

ELECTRICALLY-HEATED UTENSIL

Application filed September 25, 1924. Serial No. 739,788.

This invention relates to a vessel with self contained means for heating its contents, and has for its object to provide an improved construction of heating cup designed particularly for use in serving beverages, to which end a feature of the invention consists in constructing a cup with a multiple of walls between which a heat developing medium, preferably an electrical resistance element, may be incorporated, but which will be so limited in its area of application that while insuring heating efficiency for the contents of the cup, it will avoid objectionable heating of the outer wall of the cup, and particularly the bottom thereof, so that the cup will not be inconvenient to handle and will not suffer material heat loss during the time when it is standing on the counter away from the mixing apparatus.

Still another object is to provide a construction of multiple wall heating cup which will be easy to produce with certainty of heating effect, and particularly safe from leakage of electrical current, as well as heat radiation, and convenient to assemble and disassemble with its portable and flexible heating medium supply, to which end, a further feature of the invention consists in winding an electrical heating element around the wall of an inner container, enclosing such heating element in an intermediate wall or cup, with a substantial intervening space filled with a cement that is nonconductive of both electricity and heat as well as moisture proof and highly resistant to heat, and then enclosing the self heating double walled structure thus produced in an outer shell or cup with a substantial air space intervening, and, finally, mounting upon the outer wall, in position to receive an electric cord plug, suitably guarded terminals in electrical connection with the resistance element.

Still further objects and structural features incident thereto will be gathered from the ensuing detailed description of the preferred embodiment of the invention selected for illustration, and shown in the accompanying drawings, in which—

The figure is a vertical diametric section through a self heated cup constructed in accordance with the present invention, the plane of section including the handle and the cord connecting socket.

The cup or utensil selected for illustrating the invention, is designed especially for use upon one or more known types of drink mixers, but instead of having electrical heating connections automatically established by placing the cup in position upon an agitator as has heretofore been practiced in some instances, or instead of merely mixing the contents of the cup in a cold state, a cup 5 adapted to be mounted upon the agitator, has incorporated in its construction a heating element 6 which preferably consists of an electrical heating resistance element, and this heating element is supplied with current through means of a flexible conductor 7 associated with the cup in any suitable way, and preferably releasably, as by providing a plug 8 entering a socket 9 that is mounted on the cup, and where it receives terminals 10 leading from the resistance element 6; and the flexible connector 7 leads from some suitable source of electrical supply, so that the organization of parts involves the conditions of providing a continuously operable flexible heating medium supply releasably applied to the cup, and transferable therewith between the mixing apparatus and a conveniently adjacent stand upon the counter, so that heating may be carried on while the cup is standing on the counter or while it is being transferred to and from the mixing apparatus, as well as when in position to have its contents agitated, and in this way the duration of heating and mixing may be proportioned at will and variously to suit the particular beverages being mixed, and the time of the operative available therefor, the number of beverages in course of preparation at one time, and other conditions of traffic in the business will be advantageously affected by the arrangement described.

There may be any desired number of the cups 5, each adapted to receive a connector 7, and these may be brought into association with any existing cold drink mixer, by merely supplying necessary electrical connections adapting the cups to be interchangeably applied to the mixing apparatus, and having them of such construction that they may be set aside when agitation is not desired without interrupting the heating effect.

In preparing the cup 5, an inner container 12 of suitable form is provided, preferably with a reduced lower portion 12ª and a flaring upper portion 12ᵇ; the resistance element 6 is wound mainly about the reduced lower portion but terminates well short of the bottom so as to leave a substantial space 13 that is free from heating element, with consequent avoidance of excessive heating of the bottom of the cup which has been found objectionable in known constructions of self heating cup, as well as avoidance of rendering the exterior of the cup objectionably hot at bottom; and the container thus equipped with heating element is enclosed in an armor or sheathing cup 14 of metal of sufficiently greater transverse dimension than the container 12 to leave a substantial space between them, which is filled with a cement 15 that is non-conducting as to heat and electricity, and non-absorptive as to water, of low expansion under heat so that it does not crack, and high resistance to heat so that it will withstand the temperature that may develop in the heating element even if the current is left on without liquid contents. The cement filling 15 is adapted to the space between the container 12 and its sheathing 14 by forcing the container into the cup-like sheathing, thus firmly embedding the heating element, pressing it intimately against the wall which it is intended to heat, and holding it immovably and without possibility of erosion which might ultimately impair insulation around the heating element; and this method of assembly also results in leaving an appreciable layer of cement 16 at the bottom of the container 12, as well as in space 13, which serves to heat-insulate the cup. Finally, the container 12, with its heating element thus developed thereon, is set into the outer jacket 17 with which it contacts only at the bottom 17ª and upper edge 17ᵇ, at which latter point the inner container 12 and outer jacket 17 are brazed together. Asbestos sheets 18 and 19 interposed between the self-heating inner container and the outer member 17 together with the air space 20, affords highly efficient heat insulation, and thereby avoids waste of electrical energy in the heating of the cup.

Handle 21 is attached to the outer member 17 by means of the U-shaped ears 22 which leave free open spaces for heat radiation as well as for cleanliness; and said handle is secured to said ears by means of bolts 23, 24 passing through the upper and lower portions of the handle and having their nuts 23ª, 24ª within the U-shaped ears, while slots 22ª that receive the bolts 23, 24 facilitate assembly and compensate for irregularities in drilling the holes through the handle to receive the bolts.

I claim:

1. A self heating cup, comprising an inner container, a heating element applied thereto, a wall surrounding but spaced from said heating element, and a cement mass solidly filling the entire space between said inner container and said wall; said heating element terminating a substantial distance from the bottom of the container and leaving the lower end of the latter free from direct heating influence; and said surrounding wall extending over the unheated lower end of said container and across the bottom thereof, but separated from said unheated lower end and bottom by said cement.

2. In a heating cup, an inner container, a heating element associated therewith, a wall surrounding said heating element and the bottom of said container but spaced from both of them, a cement mass completely filling the space left by the heating element between said wall and said container, an outer jacket enclosing both the container and surrounding wall with an intervening air space except at the bottom where the container is supported by the outer jacket, and means for establishing electrical connection with the heating element.

3. An electrically heated cup comprising an inner container, an electric heating resistance surrounding and in heating relation to said inner container, but terminating above the bottom of said inner container, a metal jacket surrounding the bottom of said inner container and the portions of the walls thereof upon which the heating element is located, but spaced from said inner container, an insulating filling substance between said jacket and said inner container, and an outer wall surrounding the bottom and sides of said inner container and jacket, and upon which the inner container and jacket rest vertically but from which the said inner container and jacket are separated by an air space at their sides.

4. A self heating cup, comprising an inner container, an electric heating element closely applied to the exterior surface of said container, a metallic wall surrounding but spaced from said heating element, and a cement mass applied to the opposite side of the heating element from said container and filling the space between the heating element and said wall.

Signed at Chicago, Illinois, this 23rd day of September, 1924.

FRANK R. LACY.